(12) United States Patent
Feuchtner

(10) Patent No.: US 11,993,178 B2
(45) Date of Patent: May 28, 2024

(54) METHOD FOR OPERATING A DRIVE SYSTEM FOR A WORK MACHINE, DRIVE SYSTEM AND WORK MACHINE

(71) Applicant: ZF Friedrichshafen AG, Friedrichshafen (DE)

(72) Inventor: Norbert Feuchtner, Untergriesbach (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 810 days.

(21) Appl. No.: 17/257,020

(22) PCT Filed: Jun. 28, 2019

(86) PCT No.: PCT/EP2019/067461
§ 371 (c)(1),
(2) Date: Dec. 30, 2020

(87) PCT Pub. No.: WO2020/007751
PCT Pub. Date: Jan. 9, 2020

(65) Prior Publication Data
US 2021/0276428 A1 Sep. 9, 2021

(30) Foreign Application Priority Data
Jul. 3, 2018 (DE) ...................... 10 2018 210 911.7

(51) Int. Cl.
*B60L 7/26* (2006.01)
*B60L 58/10* (2019.01)
(Continued)

(52) U.S. Cl.
CPC ................. *B60L 7/26* (2013.01); *B60L 58/10* (2019.02); *E02F 9/207* (2013.01); *E02F 9/2225* (2013.01);
(Continued)

(58) Field of Classification Search
CPC ........ B60L 7/26; B60L 58/10; B60L 2200/40; E02F 9/207; E02F 9/2225; E02F 9/2278; E02F 9/2091; E02F 3/283
See application file for complete search history.

(56) References Cited

U.S. PATENT DOCUMENTS

| 4,397,365 A | 8/1983 | Harbe et al. |
| 10,630,211 B2 | 4/2020 | Sinn et al. |

(Continued)

FOREIGN PATENT DOCUMENTS

| DE | 3121698 A1 | 4/1982 |
| DE | 102015111926 A1 | 1/2017 |

(Continued)

*Primary Examiner* — Bryan A Evans
(74) *Attorney, Agent, or Firm* — LEYDIG, VOIT & MAYER, LTD.

(57) ABSTRACT

A method for operating a drive system for a work machine is described. A first electric motor is associated with a travel drive of the drive system and a second electric motor is associated with a work drive of the drive system. An electric energy store for operating the first and the second electric motors is associated with the travel drive and the work drive. The method includes operating the first electric motor in generator mode to produce braking power of the travel drive, electric power being produced in the generator mode. The method further includes supplying, completely or partly to the energy store and/or to the second electric motor depending on a state of the energy store, the electric power.

10 Claims, 2 Drawing Sheets

(51) Int. Cl.
  *E02F 9/20* (2006.01)
  *E02F 9/22* (2006.01)
  *E02F 3/28* (2006.01)

(52) U.S. Cl.
  CPC ......... *E02F 9/2278* (2013.01); *B60L 2200/40* (2013.01); *B60L 2240/545* (2013.01); *E02F 3/283* (2013.01); *E02F 9/2091* (2013.01)

(56) References Cited

U.S. PATENT DOCUMENTS

| | | | | |
|---|---|---|---|---|
| 2007/0095059 | A1* | 5/2007 | VerKuilen | E02F 9/2296 60/468 |
| 2010/0210409 | A1 | 8/2010 | Friesen et al. | |
| 2014/0277970 | A1 | 9/2014 | Sakamoto et al. | |
| 2016/0031328 | A1* | 2/2016 | Lindsey | B60L 15/025 307/10.1 |
| 2018/0065621 | A1* | 3/2018 | Merkle | B60L 50/15 |

FOREIGN PATENT DOCUMENTS

| | | | |
|---|---|---|---|
| EP | 0962597 | A2 | 12/1999 |
| JP | 2012017650 | A | 1/2012 |
| WO | 2008128674 | A1 | 10/2008 |
| WO | 2018001590 | A1 | 1/2018 |

* cited by examiner

METHOD FOR OPERATING A DRIVE SYSTEM FOR A WORK MACHINE, DRIVE SYSTEM AND WORK MACHINE

CROSS REFERENCE TO RELATED APPLICATIONS

This application is a U.S. National Stage Application under 35 U.S.C. § 371 of International Application No. PCT/EP2019/067461 filed on Jun. 28, 2019, and claims benefit to German Patent Application No. DE 10 2018 210 911.7 filed on Jul. 3, 2018. The International Application was published in German on Jan. 9, 2020 as WO 2020/007751 A1 under PCT Article 21(2).

FIELD

The present invention relates to a method for operating a drive system for a work machine, to a drive system for a work machine, and to a corresponding work machine.

BACKGROUND

In the prior art, electrically driven work machines, such as wheel loaders, skid-steer loaders, telescopic loaders, dumpers or excavators, are already known. Such work machines are either driven purely electrically, i.e., they have an electric battery or an electric accumulator as energy store. Or they are driven by diesel-electric means, which means that the energy required is provided by a diesel-driven generator and possibly by an electrical buffer store, such as a correspondingly dimensioned capacitor. In both cases, the mechanical power required for the travel drive and the work drive is provided by one or more electric motors.

Lastly, it is known in particular from the automobile sector to use the electric motors of electric drives for recuperating electric power during braking operations in generator mode. In addition, a mechanical friction brake is always provided so that a maximum required braking power can be provided at any time for safety reasons.

In this connection, DE 31 21 698 A1 describes a battery-powered charging vehicle, in particular for mining, having a charging device arranged at the front end of a vehicle frame and an electric travel motor and a battery box supported by the vehicle frame and detachable therefrom by means of a lifting device. Furthermore, the charging vehicle has a hydraulic pump unit, operated by an electric drive motor, with two hydraulic pumps.

EP 0962 597 A2 discloses a battery-powered work machine which has two electric motors for the travel drive and a further electric motor for the work drive.

WO 2008/128674 A1 discloses a work machine having a hybrid drive train comprising an internal combustion engine and an electric machine. An electric energy store is provided for supplying energy to the electric machine and can be charged recuperatively by operating the electric motor in generator mode during a braking operation of the work machine.

Furthermore, an agricultural work machine driven by diesel-electric means is known to the applicant under the name "Rigitrac EWD120" which comprises a diesel-driven generator for providing electric power as well as four electric individual-wheel drives integrated into the wheel rims and designed as wheel hub drives. The electric power produced by the generator is provided to the wheel hub drives. Individual control and regulation of the drive wheels is made possible by the individual-wheel drives. Furthermore, the "Rigitrac EWD120" has an electrical braking resistor which, in the generator mode of the electric motors, represents an electrical load which loads and brakes the electric motors.

SUMMARY

In an embodiment, the present invention provides a method for operating a drive system for a work machine. A first electric motor is associated with a travel drive of the drive system and a second electric motor is associated with a work drive of the drive system. An electric energy store for operating the first and the second electric motors is associated with the travel drive and the work drive. The method includes operating the first electric motor in generator mode to produce braking power of the travel drive, electric power being produced in the generator mode. The method further includes supplying, completely or partly to the energy store and/or to the second electric motor depending on a state of the energy store, the electric power.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
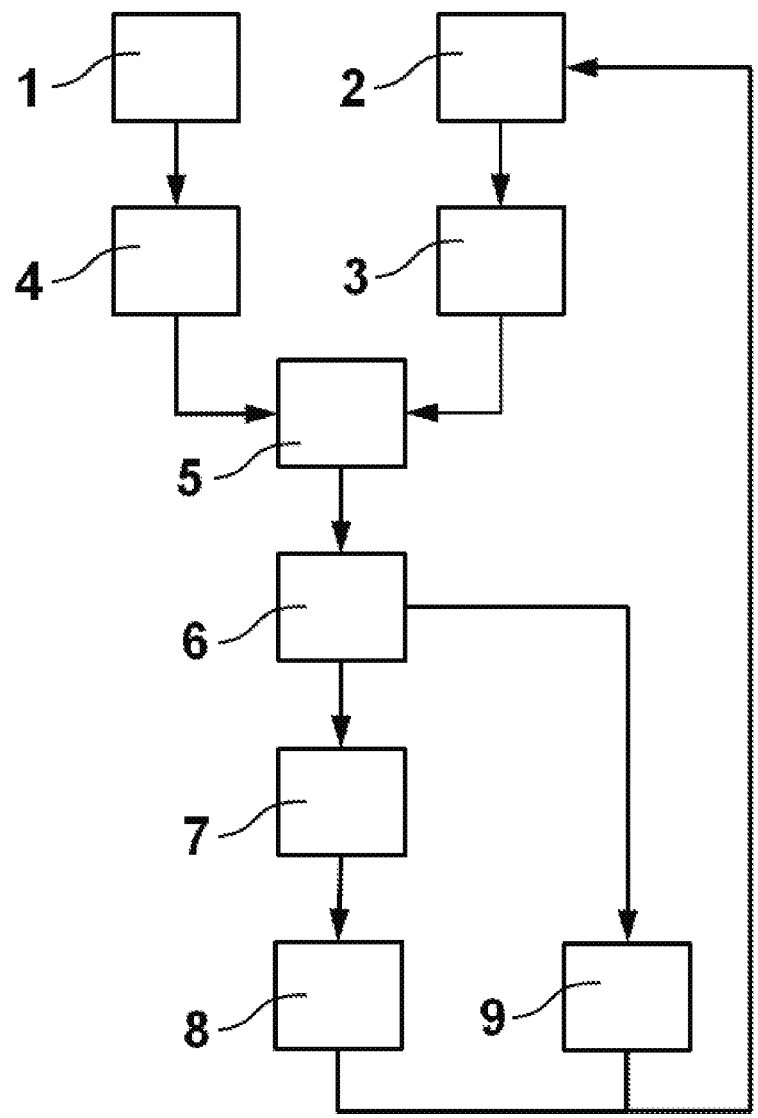
FIG. 1 illustrates, by way of example and schematically, an embodiment of a method in the form of a flowchart.

Known electric drive systems for work machines are disadvantageous in that they can only produce sufficient braking power in generator mode if the electric energy store is not yet fully charged and can still receive electrical energy or if a corresponding, separate braking resistor is provided. However, such a braking resistor is associated with additional costs, in particular also because of the active cooling device usually required for the braking resistor in order to avoid overheating of the braking resistor. If, however, only very little or no braking power can be produced by the generator mode, according to the prior art a correspondingly powerful friction brake is provided which is likewise associated with additional costs and must also be serviced or renewed regularly in order to compensate for signs of wear.

The present disclosure proposes an improved method for operating a drive system for a work machine.

The present disclosure provides a method for operating a drive system for a work machine, wherein a first electric motor is associated with a travel drive of the drive system and a second electric motor is associated with a work drive of the drive system, wherein an electric energy store for operating the first and the second electric motor is associated with the travel drive and the work drive, wherein the first electric motor is operated in generator mode to produce braking power of the travel drive and wherein electric power is produced in generator mode. The method according to the invention is characterized in that the electric power is supplied completely or partly to the energy store and/or to the second electric motor depending on a state of the energy store.

According to the disclosure, it is therefore provided that the first electric motor, which is associated with the travel drive of the work machine, is used for braking the work machine. In this case, the first electric motor is operated in generator mode and recuperates electrical energy, which is usually supplied to the electric energy store in order to charge it. Depending on the state of the electric energy store, however, it cannot receive all the recuperated power under all circumstances, for example because it is already fully charged. In order not to have to reduce the braking power produced by the first electric motor in this case, the portion of the electric power that cannot be received by the energy store and is therefore also not supplied to the energy store is supplied to the second electric motor. If the electric power could not be supplied to a consumer that can receive this power, the braking power of the first electric motor would be reduced until it only corresponds to the total power which can be received by the energy store and by the second electric motor. The second electric motor can consume the power supplied to it by converting it into mechanical work. Thus, the maximum braking power can be retrieved at any time by the generator mode of the first electric motor.

The travel drive serves to move the work machine; accordingly, the first electric motor acts on the wheels of the work machine in the drive sense. The travel drive can couple the wheels of the work machine to the first electric motor purely mechanically via a transmission or hydraulically via a pump and a hydraulic motor.

By contrast, the work drive serves to actuate working devices of the work machine, such as a bucket, a lifting arm or also a power take-off shaft. In contrast to the travel drive, however, the work drive exclusively comprises a hydraulic coupling between the working device or the working devices and the second electric motor. The hydraulic coupling preferably takes place via a hydraulic pump and a hydraulic motor. The hydraulic motor is in turn preferably designed as a hydraulic cylinder piston unit.

As a result, it is advantageously unnecessary to use a friction brake for braking the work machine before the maximum braking power of the first electric motor is utilized. On the one hand, this reduces the wear on the friction brake and on the other hand makes it possible to use a friction brake of correspondingly less powerful and thus more cost-effective design since the maximum braking power of the first electric motor can be fully utilized at least during normal operation.

Preferably, the friction brake is designed, in the event of a fault, i.e., in the event of a failure of the first electric motor or at least in the event of a failure of the braking power by the generator mode of the first electric motor, to also apply a necessary braking power on its own in order to bring the work machine safely to a standstill in each situation. However, since this braking power only has to be provided briefly until the work machine is at a one-time standstill, the friction brake can still be designed to be comparatively less powerful and more cost-effective than a conventionally used friction brake which must be able to produce such braking power during continuous operation.

Likewise, it is advantageously unnecessary to provide a correspondingly designed braking resistor which converts the excess electric power, which cannot be received by the energy store, into heat. This also leads to a cost saving.

Since the second electric motor, which consumes the excess electric power, is provided for the work drive anyway and is thus present anyway, no or only comparatively small additional costs arise due to the implementation of the method according to the invention in a drive system of a work machine.

The state of the energy store is preferably evaluated by a control unit designed for this purpose, which has all necessary sensor means for detecting the state of the energy store and a microcontroller designed to evaluate the state of the energy store.

The electric energy store is preferably designed as a rechargeable battery, e.g., as a so-called Ni-MH battery, as a so-called Li polymer battery or as a so-called Li—Fe battery.

Furthermore, the electric energy store is preferably a common energy store which is associated equally with the first and the second electric motor. As an alternative, a separate energy store is provided for the first and the second electric motor respectively; a plurality of energy stores can optionally also be provided for one or both electric motors. With regard to the weight distribution in the work machine in particular, it may be advantageous, under certain circumstances, to provide a plurality of comparatively small energy stores, which can be correspondingly arranged in the work machine in order to achieve the desired weight distribution.

In a preferred embodiment, it is provided that the state of the energy store is characterized by a state of charge of the energy store, a temperature of the energy store and/or a maximum charging current of the energy store. These physical variables allow a reliable evaluation of whether and how much electric power can still be supplied to and received by the energy store without damaging the energy store. Damage to the energy store can occur, in particular, when it is overcharged, i.e., when more electric charge is supplied to it than it can store, when too high a charging current is supplied to it and when it overheats. In this case, damage does not generally lead immediately to total failure of the energy store but initially only to a reduction in its capacity and service life.

In a particularly preferred embodiment, it is provided that the electric power is supplied to the energy store to the extent and so long as the energy store can receive electric power. This means that as much power as possible is always supplied to the energy store in order to charge the energy store as much as possible and to make the recuperated energy usable again later. This increases the operational life of the work machine and reduces the need for an external energy supply. Only the portion of the electric power that cannot be received by the energy store is supplied to the second electric motor in order to be consumed by the latter.

According to the disclosure, the wording "to the extent and so long as the energy store can receive electric power" means that the portion of the electric power recuperated by the second electric motor is supplied to the energy store "to the extent" until its maximum charging current or a critical temperature is reached. Furthermore, the electric power is supplied to the energy store for "so long" until it is completely charged and can no longer receive any further charge. In order to avoid damage to the energy store, the power beyond these limits is no longer supplied to the energy store but to the second electric motor instead.

In a further preferred embodiment, it is provided that the second electric motor drives a hydraulic pump which produces hydraulic pressure for operating the work drive. The second electric motor can thus consume the power supplied to it by driving the hydraulic pump associated with the work drive and building up hydraulic pressure corresponding to the electric power supplied thereto.

In a particularly preferred embodiment, it is provided that the hydraulic pressure is produced against a controllable hydraulic resistance. This has the advantage that the hydraulic pressure required in each case, which is required in order to consume the power supplied to the second electric motor, can be adjusted via the controllable hydraulic resistance. The higher the hydraulic resistance is, the higher is also the pressure produced by the hydraulic pump. This in turn leads to a higher power requirement or power consumption of the second electric motor. It can thus be ensured that the power consumption of the second electric motor corresponds precisely to the electric power that cannot be received by the energy store and is correspondingly supplied to the second electric motor.

In a very particularly preferred embodiment, it is provided that the hydraulic resistance is adjusted by means of a bypass valve. This is an equally simple and reliable way of controlling or regulating the hydraulic resistance and thus the hydraulic pressure. In order to increase the hydraulic resistance, a through-flow opening of the bypass valve can be reduced and the through-flow opening can be increased again to reduce the hydraulic resistance. Alternatively, instead of the through-flow opening width, the opening pressure of the bypass valve can also be regulated so that the bypass valve opens at higher or lower pressures as required and prevents further pressure build-up. The power consumption of the second electric motor can thus be regulated via the bypass valve.

The bypass valve is preferably designed as an electromagnetic valve. An electromagnetic valve can be controlled or regulated comparatively simply and precisely and is also suitable for switching high hydraulic pressures.

In another very particularly preferred embodiment, it is provided that the hydraulic resistance is adjusted in such a way that the total electric power can be supplied completely to the energy store and/or the second electric motor. As a result, the first electric motor can be used essentially without restriction for producing braking power in the travel drive of the work machine. If, in contrast, the total electric power were not completely consumed, i.e., not completely supplied to the energy store and/or the second electric motor, the braking power of the first electric motor in generator mode would be reduced to the power that can be consumed by the energy store and/or the second electric motor.

In a further preferred embodiment, it is provided that a friction brake limits the electric power that can be produced in generator mode if it exceeds the total electric power that can be received in total by the energy store and by the second electric motor. However, the friction brake does not work against the generator mode of the first electric motor but merely reduces the vehicle's kinetic energy that is available for generator mode. This ensures that a sufficient braking power can still be provided in the travel drive of the work machine by means of the friction brake, even if the electric power produced by a sole braking via the generator mode of the first electric motor could no longer be consumed and the braking power of the first electric motor would thus be reduced. Thus, a sufficient braking power can be provided at any time, and in particular in emergency situations which require an immediate braking of the work machine, by a common braking via the generator mode of the first electric motor and the involvement of the friction brake.

The friction brake is particularly preferably designed in such a way that it can also provide sufficient braking power, independently of the braking power of the generator mode of the first electric motor, in order to stop the work machine immediately, even in emergency situations.

The disclosure also relates to a drive system for a work machine, comprising a travel drive having a first electric motor and a work drive having a second electric motor, wherein an electric energy store for operating the first and the second electric motor is associated with the travel drive and the work drive, wherein the first electric motor can be in generator mode to produce braking power of the travel drive, and wherein an electric power is produced in generator mode. The drive system is characterized in that a control unit of the drive system is designed to supply the electric power completely or partly to the energy store and/or to the second electric motor depending on a state of the energy store. The advantages already described in connection with the aforementioned method also result for the drive system.

The control unit preferably comprises all necessary sensor means for detecting the state of the energy store and a microcontroller designed for this purpose for evaluating the state of the energy store. Furthermore, the control unit preferably comprises sensor means for detecting the electric power produced by the first electric motor in generator mode and switching means, in particular semiconductor switching means, for distributing the electric power to the energy store and the second electric motor.

Although at least one control unit is designed according to the invention to according to the invention supply the electric power to the energy store or the second electric motor, this does not mean that only a single control unit has to be provided for the first and the second electric motor. Rather, the first electric motor can have a first control unit and the second electric motor can have a second control unit.

In the presence of a first and a second control unit, they are preferably communicatively connected to one another, in particular via a CAN bus. In this case, the first control unit particularly preferably carries out the method according to the invention and can override the second control unit.

Preferably, the control unit also regulates a bypass valve associated with the drive system in order to regulate a hydraulic resistance for regulating hydraulic pressure which is built up by a pump driven by the second electric motor. The control unit can thus regulate the power consumption of the second electric motor in a simple manner.

In a preferred embodiment, it is provided that the drive system is designed to carry out the method. For this purpose, the drive system has all necessary devices and means.

The invention lastly relates to a work machine comprising a drive system. The advantages already described in connection with the drive system also result for the work machine.

The work machine is preferably a wheel loader. However, it can also be a skid-steer loader, telescopic loader, dumper, excavator or tractor.

Identical objects, functional units and comparable components are designated with the same reference signs across the figures. These objects, functional units and comparable components have an identical design in terms of their technical features, unless explicitly or implicitly provided otherwise in the description.

FIG. 1 shows by way of example and schematically an embodiment of a method in the form of a flowchart. The method is carried out in a drive system 11 of a work machine 10, for example a wheel loader 10, wherein the drive system 11 of the work machine 10 comprises a first electric motor 13 and a second electric motor 19. The first electric motor 13 is associated with a travel drive 12 of the drive system 11, whereas the second electric motor 19 is associated with a work drive 18 of the drive system 11. In the travel drive 12, the first electric motor 13 acts via a mechanical transmission 14 via a Cardan shaft 15 and drive axles 16, 16' on drive wheels 17, 17' of the work machine 10. In contrast, in the work drive 18, the second electric motor 19 drives a hydraulic pump 23 which in turn actuates a working device 22, such as a lifting arm 21, via a hydraulic motor 20, 20', in particular a hydraulic cylinder piston unit 20, 20'. Both the first electric motor 13 and the second electric motor 19 are connected to an electric energy store 24 for supplying electrical energy. In method step 1, the work machine 10 now begins, for example, a braking operation, for which the first electric motor 13 is operated in generator mode and the braking power of the first electric motor 13 produced thereby is utilized on the travel drive 12 of the work machine 10. At the same time, in step 2, the state of the energy store 24 is detected by a control unit 25 designed for this purpose. To this end, the control unit 25 comprises a voltage sensor for detecting an electrical voltage of the energy store 24 and a temperature sensor for detecting a temperature of the energy store 24. Furthermore, the control unit 25 has information in an electronic memory about the maximum charging current which can be supplied to the energy store 24. By means of a microcontroller designed for this purpose and correspondingly programmed, the control unit 25 evaluates the detected data in step 3 and determines that the energy store 24 can currently be charged in principle without being damaged. At the same time, in method step 4, electric power is produced by the generator mode of the first electric motor 13. By means of a current sensor and a further voltage sensor, the control unit 25 detects in step 5 the power produced by the first electric motor 13. In step 6, the control unit 25 determines, for example, that the power produced is too great to be supplied exclusively to the energy store 24. This is because, due to the high state of charge of the energy store 24, only a low electric power for charging the energy store 24 can be supplied thereto, for example. The control unit 25 determines which portion of the electric power can still be supplied to the energy store 24 and which portion of the electric power must be supplied to the second electric motor 19 for immediate consumption. Via suitable switching means 26, the control unit 25 thus supplies in step 7 to the energy store 24 exactly the portion of the electric power that the energy store 24 can still receive without being damaged. It supplies the other portion to the second electric motor 19. Both portions in total always result in the total power produced by the first electric motor 13. In method step 8, the second electric motor 19 now drives the hydraulic pump 23 with the electric power supplied thereto, as a result of which the electric power is converted into mechanical or hydraulic power. The resulting hydraulic pressure serves, for example, to operate the work drive 18. In order to ensure that the portion, determined in step 6, of the electric power that is supplied to the second electric motor 19 is actually completely consumed by the second electric motor 19, a hydraulic resistance, against which the hydraulic pressure is produced by the second electric motor 19 by means of the hydraulic pump 23, is adjusted in step 9 simultaneously to step 8. The load and thus the power requirement of the second electric motor 19 can thus be regulated in a targeted manner. The hydraulic resistance is adjusted, for example, by means of a bypass valve 27 which opens when an adjustable pressure is exceeded and thus permits a pressure reduction while consuming the power supplied to the second electric motor 19. Since it is a bypass valve, no working device 21, 22 of the work drive 18 is actuated. The control unit 25 continues to carry out permanent monitoring of the state of the energy store 24, as a result of which the method described by way of example begins anew starting from method step 2.

Figure 2:
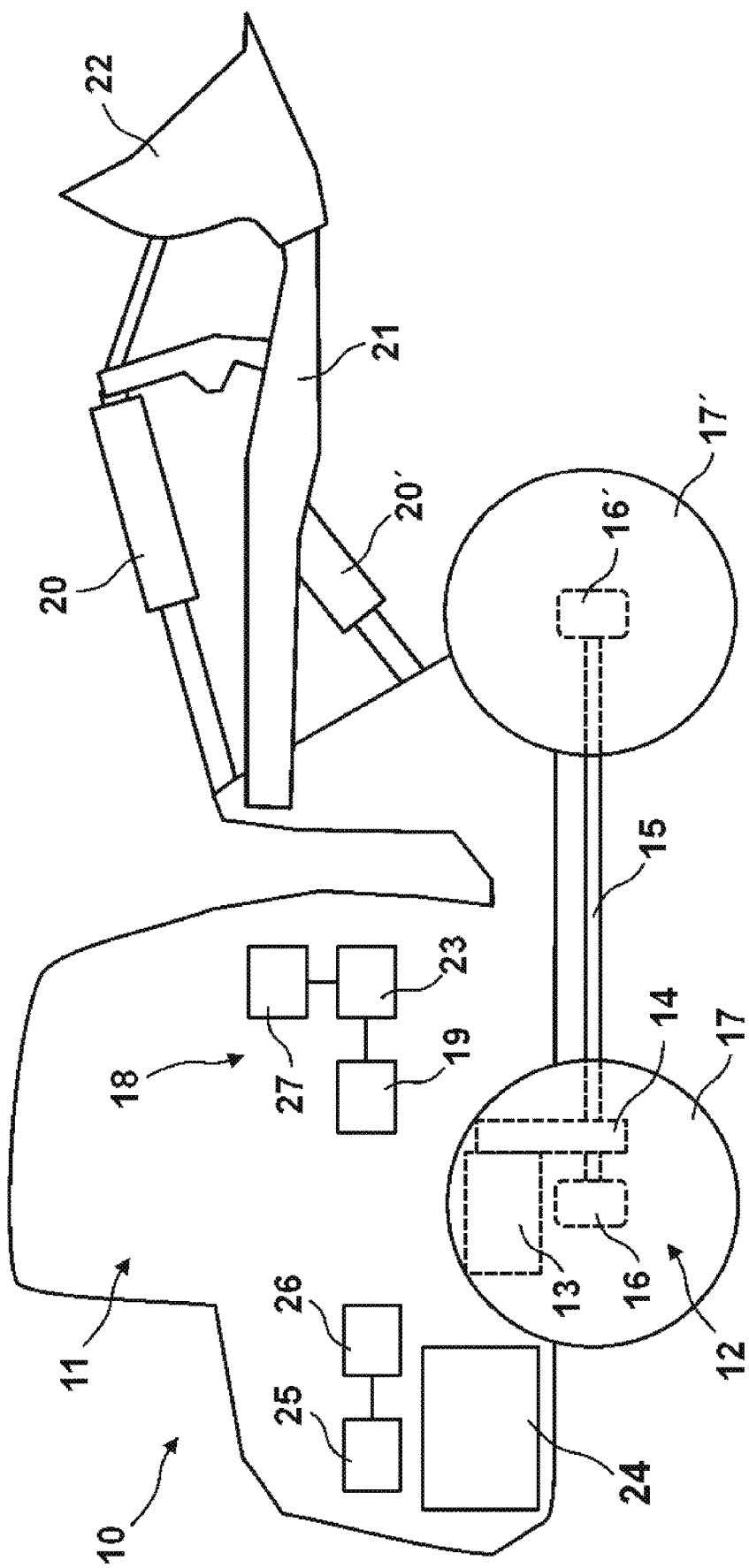
FIG. 2 illustrates, by way of example and schematically, a possible embodiment of a work machine with a drive system.

FIG. 2 shows by way of example and schematically a possible embodiment of a work machine 10 with a drive system 11. The work machine 10 is, for example, a wheel loader 10 driven by an electric motor. The drive system 11 comprises, for example, a travel drive 12 having a first electric motor 13, a mechanical transmission 14, a drive shaft 15, drive axles 16, 16' and drive wheels 17, 17' of the wheel loader 10. The drive system 11 furthermore comprises a work drive 18 having a second electric motor 19, a hydraulic pump 23 driven by the second electric motor 19, and two cylinder piston units 20, 20' for actuating a lifting arm 21 and a loading bucket 22. Lastly, the drive system 11 also comprises an electric energy store 24 which, for example, is designed as an Li polymer battery and supplies both the first electric motor 13 and the second electric motor 19 with electrical energy or electric power. In order to produce braking power of the travel drive 12, the first electric motor 13 can be operated in generator mode so that an electric power is produced. This power produced by the first electric motor 13 is first used to charge the energy store 24 to the extent and so long as this is possible without damaging the energy store 24 by an excessively high charging current, by overcharging or also by overheating the energy store 24, for example. For this purpose, the drive system 11 furthermore has a control unit 25 which is designed to supply the electric power completely or partly to the energy store 24 and/or to the second electric motor 19 depending on the respective state of the energy store 24. For this purpose, the control unit 25 controls switching means 26 which supply the produced power to either the energy store 24 or the second electric motor 19 in accordance with what the control unit 25 specifies. As already described, power supplied to the energy store 24 is used to charge the energy store 24. Only the power that cannot be supplied to the energy store 24 without damaging it is supplied to and consumed by the second electric motor 19 so that the first electric motor 13 can develop a maximum braking power in generator mode. In order to adapt the power requirement or the power consumption of the second electric motor 19 to the power that cannot be supplied to the energy store 24, the second electric motor 19 produces hydraulic pressure against a regulatable hydraulic resistance via the pump 23. The regulatable hydraulic resistance can be regulated by the control unit 25 by means of a bypass valve 27, for example.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 Start of braking operation
2 Detecting the state of the energy store
3 Evaluating the state of the energy store
4 Producing the electric power
5 Detecting the electric power
6 Evaluating the electric power
7 Supplying electric power to the energy store and/or the second electric motor
8 Driving the hydraulic pump
9 Adjusting the hydraulic resistance
10 Work machine, wheel loader
11 Drive system
12 Travel drive
13 First electric motor
14 Mechanical transmission
15 Drive shaft
16 Front wheels
17 Rear wheels
18 Work drive
19 Second electric motor
20, 20' Hydraulic motor, cylinder piston unit
21 Lifting arm
22 Working device, loading bucket
23 Hydraulic pump
24 Energy store
25 Control unit
26 Switching means
27 Bypass valve

The invention claimed is:

1. A method for operating a drive system for a work machine, wherein a first electric motor is associated with a travel drive of the drive system and a second electric motor is associated with a work drive of the drive system, wherein an electric energy store for operating the first and the second electric motor is associated with the travel drive and the work drive, the method comprising:
   operating the first electric motor in generator mode to produce braking power of the travel drive; wherein electric power is produced in the generator mode,
   supplying, completely or partly to the energy store and/or to the second electric motor depending on a state of the energy store, the electric power,
   wherein a friction brake limits the electric power that can be produced in generator mode if it exceeds the total electric power that can be received in total by the energy store and by the second electric motor.

2. The method according to claim 1, wherein the state of the energy store is a state of charge of the energy store, a temperature of the energy store, and/or a maximum charging current of the energy store.

3. The method according to claim 1, wherein the electric power is supplied to the energy store to the extent and so long as the energy store can receive electric power.

4. The method according to claim 1, wherein the second electric motor is configured to drive a hydraulic pump that produces hydraulic pressure for operating the work drive.

5. The method according to claim 4, wherein the hydraulic pressure is produced against a regulatable hydraulic resistance.

6. The method according to claim 5, wherein the hydraulic resistance is adjusted by a bypass valve.

7. The method according to claim 5, wherein the hydraulic resistance is adjusted in such a way that the total electric power can be supplied completely to the energy store and/or to the second electric motor.

8. A drive system configured to carry out a method according to claim 1.

9. A drive system for a work machine, comprising:
   a travel drive having a first electric motor;
   a work drive having a second electric motor;
   a common electric energy store configured to operate the first and the second electric motors, the common electric energy store being associated with the travel drive and the work drive,
   wherein the first electric motor is configured to be operated in generator mode to produce braking power of the travel drive; and
   a friction brake,
   wherein electric power is produced in generator mode,
   wherein a controller of the drive system is configured to supply the electric power completely or partly to the common electric energy store and/or to the second electric motor depending on a state of the common electric energy store, and
   wherein the friction brake limits the electric power that can be produced in the generator mode if it exceeds the total electric power that can be received in total by the common electric energy store and by the second electric motor.

10. A work machine comprising a drive system according to claim 9.

* * * * *